Dec. 23, 1958    J. I. SLAUGHTER    2,865,615
HIGH PRESSURE STIRRER CONTACTING APPARATUS
Filed April 29, 1955    2 Sheets-Sheet 1
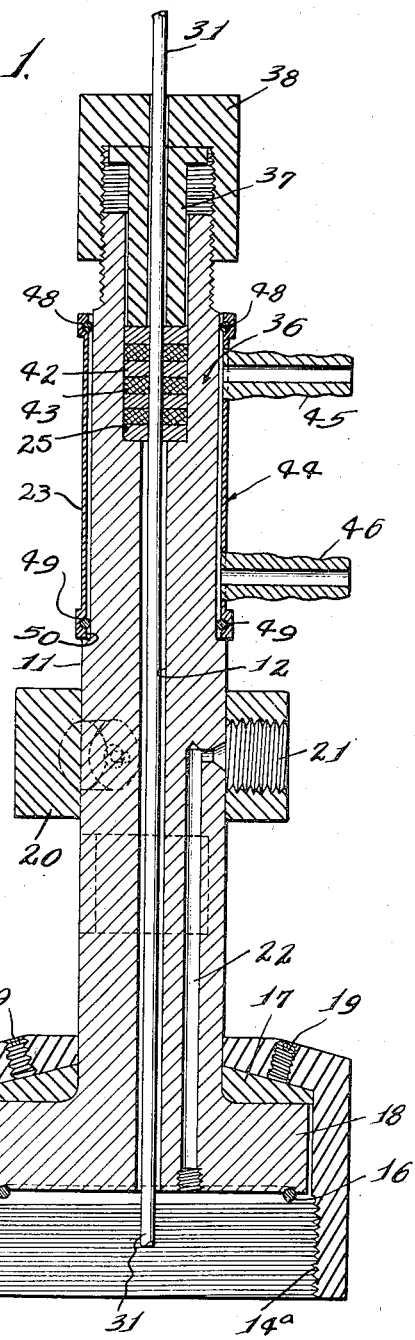
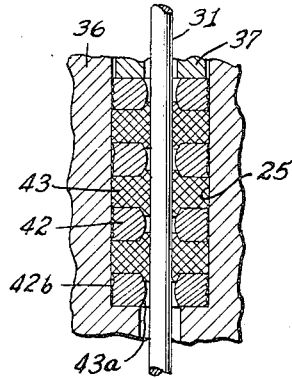
INVENTOR.
John I. Slaughter.
BY Everett A. Johnson
Attorney.

Dec. 23, 1958   J. I. SLAUGHTER   2,865,615
HIGH PRESSURE STIRRER CONTACTING APPARATUS
Filed April 29, 1955   2 Sheets-Sheet 2
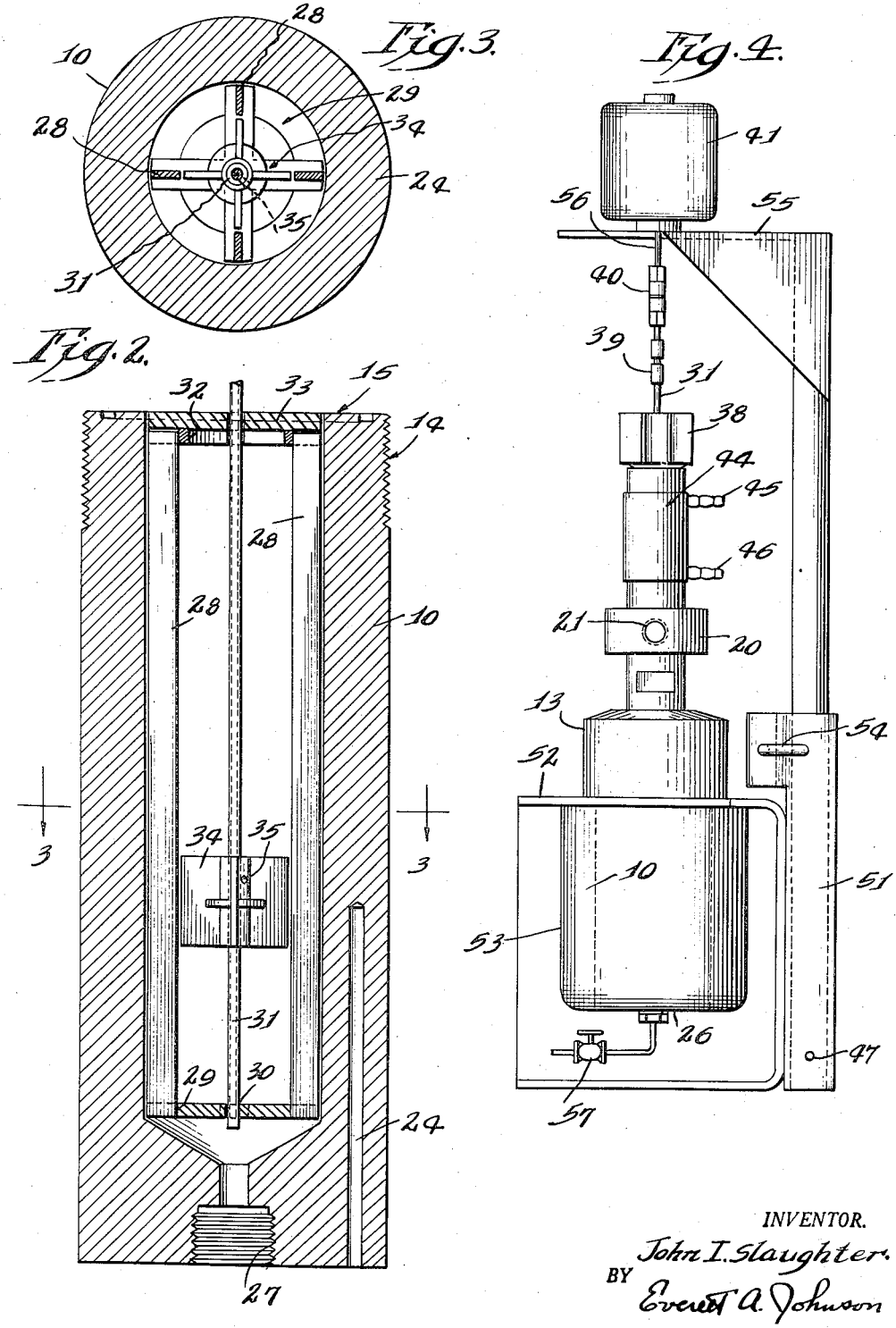
INVENTOR.
John I. Slaughter.
BY Everett A. Johnson
Attorney.

United States Patent Office 2,865,615
Patented Dec. 23, 1958

2,865,615

HIGH PRESSURE STIRRER CONTACTING APPARATUS

John I. Slaughter, Hammond, Ind., assignor to Standard Oil Company, Chicago, Ill., a corporation of Indiana Application April 29, 1955, Serial No. 504,972

6 Claims. (Cl. 259—107)

This invention relates to high pressure contacting apparatus and it pertains more particularly to improved apparatus for effecting contact between separate phases under extremely high pressure and closely controlled temperature conditions.

Heretofore many different means have been proposed for introducing a stirrer into a reactor vessel. However, such arrangements have not been generally satisfactory and have presented problems with respect to lubrication of the shaft. These problems are multiplied where the reactor is operated at high pressures and where only trace amounts of catalyst materials are used which may become poisoned by or react with the lubricant.

It is, therefore, a primary object of this invention to provide an improved shaft seal which operates without additional lubrication and which is adjustable to maintain a fluid-tight seal over long periods of time. A further object of the invention is to provide an improved stirring mechanism adapted for use on high pressure apparatus. A more specific object is to provide a stirring apparatus for reactors operated at elevated temperatures and high pressures differentials. Still another object of the invention is to provide a rotated stirrer actuating means adapted for long and efficient operation without substantial leakage under the severe operating conditions. These and other objects of the invention will become apparent as the detailed description of the apparatus proceeds.

A typical high pressure reactor system includes an upright open-ended contactor of thick-walled construction. A removable head for the contactor vessel includes an axially-extending housing adapted to withstand high pressures and within which the stirrer shaft is rotated through a packing gland. Heretofore, many types of packings have been attempted for such service but they have been unsatisfactory for one reason or another. Accordingly, it is with respect to this high pressure seal that this invention is particularly concerned.

Briefly, according to my invention, the packing seal comprises a plurality of washers composed alternately of metal and an inert extrudable plastic material such as Teflon (tetrafluoroethylene resin), each inert disc comprising a bushing within which the stirrer shaft is rotated. The size of the bores in the extrudable washers or discs is somewhat less than the bores in the metal heat-dissipating discs so that there is a wiping action by the extrudable discs on the rotating shaft. This type of packing gland has been operated without leakage of corrosive gases and without freezing of the shaft even at pressure above 1000 p. s. i. and shaft speeds as high as in the range of 500 to 1700 R. P. M., and higher.

The invention will be more clearly understood from the following detailed description of a preferred example thereof which should be read in conjunction with the accompanying drawings in which:

Figure 1 is a schematic view, partly in section, of the improved seal head;

Figure 1a is an enlarged sectional view of the head in Figure 1;

Figure 2 is a schematic view, partly in section, of the contacting vessel and its baffles which is used with the sealing head of Figure 1;

Figure 3 is a section taken along the line 3—3 in Figure 2; and

Figure 4 is an elevation of an apparatus assembly employing my contactor.

As an example of the invention, an apparatus will be described which is designed to obtain closely controlled contacting at an elevated temperature and at high pressures in excess of about 1000 p. s. i., and at shaft speeds in excess of about 500 R. P. M.

Referring to the drawings, the reactor or contactor assembly is formed principally by the upright open-ended cylindrical pressure vessel 10 which may have walls about 0.75 inch thick, an inside diameter of about 1.75 inches and an overall height of about 6.0 inches.

The reactor head 11, having a bore 12, is secured to the open end of the vessel 10 by threaded closure cap 13 which slides over the axially extending cylindrical portion of the head 11 and engages the external threads 14 at the top of the vessel 10. The upper end of the vessel 10 is provided with a seat 15 which accommodates the head closure gasket 16 for fluid and pressure-tight seal between the head 11 and the vessel 10.

A thrust ring 17, having a sloping upper surface conforming to the inner surface of the cap 13, may be provided between the lower face of the closure cap 13 and the flange 18 on the head 11. A plurality of set screws 19 are threaded through the cap 13 and equalize the pressure exerted on the tapered thrust ring 17 and the flange 18 on head 11. This assembly is readily adjustable, is pressure-tight and can be demounted readily.

The reactor head 11 is provided with a high pressure connection ring 20 carrying two or more ports 21, all but one of which is connected to the central bore 12 of the head 11. The excepted port 21 connects to a separate bore 22 in head 11 which terminates internally in a threaded connection whereby a dip tube (not shown) may be inserted for withdrawing samples of contents without opening the reactor 10. Reactants or any fluid may be introduced into the reactor 10 through any of the ports 21 and one of them is preferably equipped with a frangible safety disc means (not shown) which is designed to rupture if excessive pressure is attained.

The bottom of the reactor 10 is closed by a nut 26 which engages corresponding threads in the recess 27 in the bottom of the reactor 10. A thermocouple well 24 extends upwardly through the wall of the reactor 10.

Within the reactor 10, I provide a baffle system comprising the longitudinal strip baffles 28 which are held in spaced relation at the bottom by the cross or slotted spider 29. A bore 30 in spider 29 guides the lower end of the stirrer shaft 31. A radially-slotted ring 32 is disposed at the upper ends of the baffles 28 to maintain them in the desired position.

The baffle assembly, including the bottom spider 29, the longitudinal baffles 28 and the top spacer ring 33, may be constructed of Hastelloy B, Teflon, and the like. The ring 32 has radial slots into which the upper ends of the baffles 28 fit and when in place the shaft 31 passes through the center of the ring 32 and the bottom spider 29 provides a sleeve bearing 30 for the rod 31. The spider 29 has slots into which the lower ends of the baffles 28 fit. Typically, the baffles 28 may be about $1/16$ inch thick and extend about 0.25 inch radially from the wall of the reactor 10. The unit is maintained in a press fit within the reactor 10, the individual baffles 28 being sprung radially outward at about their mid-point so as to press against the reactor wall and the tension on the baffles 28 is sufficient to keep the whole assembly in place when the impeller 34 is rotated. The ring 32 and the baffles 28, as well as the spider 29, can be removed readily from the autoclave body or reactor 10 as a unit. A splash plate 33 rests on the ring 32.

Referring to the stirring assembly, an operating shaft means comprises the flexible stem 31 which may be piano wire and the impeller 34 fixed thereto as, for example, by set screw 35. The stem 31 passes within the bore 12 in head 11 and through the packing gland 36, the packing follower 37 and the gland nut 38 threaded to the upper end of the head 11 in alignment with the bore 12. The stirring shaft 31 is rotated through the universal 39 and the coupling 40 by means of the electric motor 41.

The stirring shaft 31 may comprise a flexible rod, for example of tungsten, having a diameter of about 0.100 inch. The surface polish of the stirring rod 31 is an important factor in the life of the packing 36 and it should be carefully polished so as to avoid any tendency of the shaft 31 to act as an auger on the packing 36 which would result in an excessive rate of extrusion.

The packing gland 36 comprises a plurality of alternated heat-conducting and bearing discs 42 and 43, respectively. The heat-conducting gaskets or washers 42 have a clearance about the stirring rod 31 of about 0.001 inch. The object of the controlled clearance is to provide for a rate of extrusion of the plastic bearing washers 43 which is approximately equal to the rate at which the plastic wears down in the bearing. Greater clearances result in the too rapid extrusion of the plastic bearing washers 43 and I have found that the life of the packing 36 is greatly increased when this fit is attained.

The heat exchange washers 42 are preferably in intimate contact with the wall of the chamber 25 in the housing 11. However, even without metal-to-metal contact, the presence of the heat exchange washers 42 on opposite surfaces of the individual washers 43 decreases the diameter-for-heat transfer of the bearing washers 43 to a value approaching zero which results in efficient removal of heat from the bearing washers 43 in the region of the stirring rod 31 thereby prolonging the initial fit and minimizing the rate of extrusion and hence the rate of consumption of the bearing washers 43.

The discs 42 efficiently cool the packing 43 and the spacers 42 are in turn cooled by the surrounding water jacket 44 having an inlet 45 and an outlet 46. The ends of the sleeve 23 which form the jacket 44 are provided with O-ring seals 48 and 49.

The jacket unit 44 is slipped over the end of the head 11 until the lower O-ring seal 49 reaches the shoulder 50 on the head 11 thereby providing an annular chamber between the sleeve 23 and the recessed wall of the head 11. If desired, a 180 degree baffle may be arranged transverse to the axis of the head 11 intermediate the inlet hose connection 45 and the outlet hose connection 46 to prevent by-passing of cooling fluid downwardly through the annular chamber of the jacket 44.

The Teflon gasket discs 43 are inert to corrosive materials over a wide temperature range and yet are extrudable to compensate for wear during the high speed use. Thus, by tightening the gland nut 38, the packing follower 37 compresses the layered gaskets to maintain the gland completely pressure- or vacuum-tight.

The bearing washers 43 are preferably made of a waxy plastic such as Teflon (polytetrafluoroethylene) and polyethylene. However, other materials which are self-lubricating, inert to reactants, and extrudable may be used. Other materials which are suitable include nylon, polyurethanes, and the like. The heat exchange discs 42 should be about 0.25 inch in thickness and may be comprised of copper, aluminum, Hastelloy, etc.

I prefer to use at least two bearing washers 43 in combination with at least three heat exchange washers 42. A preferred assembly comprises at least three bearing washers 43 with at least four heat exchange discs 42. Heat exchange discs 42 serve the useful purpose of aligning the bearing washers 43 with respect to the rotating shaft 31 and this is particularly beneficial when the shaft 31 is resilient. The bearing washers 43 should not be thicker than about 0.25 inch and not thinner than about 0.05 inch, preferably about 0.125 inch.

A useful support for the complete reactor 10 and stirring mechanism may comprise the frame 51 having a beam support 52 which engages the head 11 below the cap 13. This permits the removal of the heater 53 and the application of a liquid cooling bath (not shown) without dismantling or lifting the assembly. The strip heater 53 about the reactor 10 is preferably of the well known "Glascol" type (described for example in U. S. Patents 2,231,506 and 2,282,078) since such a heat source is easily controlled and easily applied to the reactor 10. However, other heating means, such as steam or liquid heating jackets, can be used if they have the required heat input.

The frame 51 is separable by loosening the taper pin 47 and the quill joint 54 so that the motor 41 supported by platform 55 on frame 51, drive shaft 56 and head 11 may be lifted from or rotated on the supported reactor 10.

The packing 36 has been illustrated as comprising a plurality of flat discs 42 and 43 having substantially parallel faces. However, it is contemplated, for example, that the bearing washers 43 may be generally lens shaped, converging to a thickness of at least 0.05 inch at the periphery. The adjacent heat exchange discs 42 may be provided with low peripheral edges or walls conforming to the general contour of the convex portion of the lens faces of the bearing washers 43. In Figure 1a the rod-receiving apertures in the heat exchange discs 42 are bevelled to accommodate a sleeve 43a of extruded plastic whereby substantially the entire length of the rod 31 within the packing 36 is surrounded by a sleeve of migrating plastic. A modification in the packing 36 is to provide the copper discs 42 with deformable peripheral fins 42b whereby the discs 42 may be intimately contacted with the wall of the chamber 25 thereby further enhancing the rate of heat exchange of the bearing washers 43 to the cooling jacket 44.

Although the invention has been described with reference to a preferred embodiment thereof, it is to be understood that this is by way of illustration only. Accordingly, it is contemplated that modifications and variations can be made in the apparatus by those skilled in the art in light of the preceding description and without departing from the spirit of the invention.

What I claim is:

1. A reaction vessel adapted to operate at elevated temperature and under high pressure which comprises a pressure vessel, said vessel having an internal cylindrical chamber of substantially uniform diameter, a removable elongated head for said vessel, an axial bore through said head, a rotatable shaft extending through said bore into said vessel, agitator means on said shaft, removable longitudinal baffles disposed adjacent the walls of said chamber, a radially slotted ring at the upper end of said chamber through which said shaft passes and a slotted spider adjacent the bottom of said chamber having a guide bore into which said shaft extends, said slots receiving opposite ends of said baffles and securing said baffles in radial and longitudinal alignment, an enlarged chamber in the upper end of said head concentric with the axis of said shaft-receiving bore, a packing within said chamber, and a cooling jacket exterior of said head in the region of said packing.

2. A reaction vessel adapted to operate at elevated temperature and under high pressure which comprises a pressure vessel, said vessel having an internal cylindrical chamber of substantially uniform diameter, a removable elongated head for said vessel, an axial bore through said head, a rotatable shaft extending through said bore into said vessel, agitator means on said shaft, removable longitudinal baffles disposed adjacent the inner wall of said chamber, a radially slotted ring at the upper end of said chamber through which said shaft passes and a slotted spider adjacent the bottom of said chamber having a guide bore into which said shaft extends, said slots receiving opposite ends of said baffles and securing said baffles in radial and longitudinal alignment, a packing gland means at the upper end of said elongated head within which said shaft is rotated, an enlarged chamber in the upper end of said head concentric with the axis of said shaft-receiving bore, a packing within said chamber, and a cooling jacket exterior of said head in the region of said packing whereby the packing seal is maintained at a non-seizing temperature and whereby said packing is maintained in a fluid-tight seal against pressure differentials.

3. A packing assembly for use on shafts having small diameters of the order of 0.100 inch comprising an array of flat rings of heat conducting metal alternated with a number of extrudable plastic washers, said rings having a clearance of about 0.001 inch surrounding said shaft, and said washers being in wiping contact with said shaft, said washers and rings being alternatively disposed in said array, and packing follower means for placing said array under extrusion pressure whereby the plastic washers are extruded from between said rings into said shaft clearances to provide a substantially continuous sleeve of plastic in wiping contact with said shaft throughout substantially the length of said shaft in the region of said array.

4. A packing assembly for use on a rotatable shaft which comprises in combination a pack of alternated heat dissipating rings and extrudable self-lubricating plastic washers, means for confining such pack of rings and washers about said rotatable shaft, adjustable means adapted to compress the pack and extrude the washers radially inward into contact with the rotatable shaft, said heat dissipating rings having shaft-receiving apertures providing substantial clearances about said shaft and said plastic washers being extruded into said clearances to provide a substantially continuous sleeve of plastic in running fit with said rotatable shaft, whereby the said packing assembly is self-sealing, self-lubricating and self-cooling.

5. A packing assembly adapted for use as a high pressure seal on a rotated shaft of small diameter which comprises a housing through which said shaft passes, a chamber in said housing surrounding a portion of the length of said shaft and accommodating a packing, said packing comprising a plurality of alternatively disposed extrudable washers and substantially non-deformable heat conducting metal discs, said discs having substantial clearance about said shaft and having the peripheral edges thereof in heat conducting contact with the walls of the said chamber, adjustable packing follower means projecting into said chamber and contacting said packing whereby compression of said packing by said follower means brings the deformable bearing discs into contact with the rotated shaft and extrudes said deformable discs into said clearances thereby providing a fluid-tight self-lubricated seal about said shaft which is maintained at a low operating temperature to minimize any tendency of the packing to seize the rotated shaft.

6. The packing assembly of claim 4 wherein the shaft-receiving apertures in the heat dissipating rings are bevelled and are provided with deformable peripheral fins whereby the rings are maintained in contact with the wall of the confining chamber and the extrudable plastic washers are deformed into the bevelled apertures so that the shaft is substantially surrounded by a sleeve of migrating plastic.

References Cited in the file of this patent

UNITED STATES PATENTS

| 30,424 | Reid | Oct. 16, 1860 |
| 1,515,816 | Smith | Nov. 18, 1924 |
| 2,069,338 | Tennant | Feb. 2, 1937 |
| 2,136,936 | Cohen | Nov. 15, 1938 |
| 2,326,268 | Walter | Aug. 10, 1943 |
| 2,392,542 | Matuszak | Jan. 8, 1946 |
| 2,558,037 | Calhoun et al. | June 26, 1951 |
| 2,571,560 | Gall | Oct. 16, 1951 |

FOREIGN PATENTS

| 242,687 | Switzerland | Oct. 16, 1946 |